United States Patent [19]

Percival et al.

[11] Patent Number: 5,617,244

[45] Date of Patent: Apr. 1, 1997

[54] OPTICAL AMPLIFIER AND LASER

[75] Inventors: Robert M. Percival, Suffolk; Steven T. Davey, Ipswich; Daryl Szebesta, Suffolk, all of United Kingdom

[73] Assignee: British Telecommunications public limited company, London, England

[21] Appl. No.: 513,944

[22] PCT Filed: Feb. 11, 1994

[86] PCT No.: PCT/GB94/00279

§ 371 Date: Sep. 8, 1995

§ 102(e) Date: Sep. 8, 1995

[87] PCT Pub. No.: WO94/22190

PCT Pub. Date: Sep. 29, 1994

[30] Foreign Application Priority Data

Mar. 18, 1993 [GB] United Kingdom .................. 9305604

[51] Int. Cl.$^6$ ................. H01S 3/17; H01S 3/14; C03C 3/247
[52] U.S. Cl. ................ 359/341; 359/343; 359/345; 372/6
[58] Field of Search .................... 359/341, 343, 359/345; 372/6, 40, 70

[56] References Cited

U.S. PATENT DOCUMENTS

| | | | |
|---|---|---|---|
| 5,067,134 | 11/1991 | Oomen | 372/6 |
| 5,299,210 | 3/1994 | Snitzer et al. | 372/6 |
| 5,341,237 | 8/1994 | Tohmon et al. | 359/341 |
| 5,366,937 | 11/1994 | Schneider et al. | 501/40 |
| 5,432,806 | 7/1995 | Snitzer | 372/6 |

OTHER PUBLICATIONS

Oomen et al, Philips Jour. of Research, vol. 46, N–4–5, 1992, pp. 157–198; abst. only herewith.

Zhang et al, J. Lermin., vol. 40–41, pp. 655–656, Feb. 1988; abst. only herewith.

Lauder et al, J. Non–Cryst. Solids; 8th Int. Symp. on Halide Glasses, Sep. 22, 1992; abst. only herewith.

Perceival et al, Electronics Letters, vol. 29, #12, Jun. 10, 1993, pp. 1054–1056.

*Primary Examiner*—Nelson Moskowitz
*Attorney, Agent, or Firm*—Nixon & Vanderhye P.C.

[57] ABSTRACT

A laser has a resonant cavity defined by a pair of mirrors butted to respective ends of a fluorozirconate optical fiber. The fiber has a numerical aperture of 0.205 and an $LP_{11}$ mode cut-off of about 2.0 µm. The fibre is co-doped with thulium ions to a concentration of about 0.1%, and with terbium ions to a concentration of about 1%. An optical pump source provides a pump signal at 775 nm which excites the thulium ions into the $^1G_4$ energy level to provide lasing at about 475 nm. The pump source is preferably a high power semiconductor laser.

15 Claims, 2 Drawing Sheets

OPTICAL AMPLIFIER AND LASER

FIELD OF THE INVENTION

This invention relates to an optical amplifier, and in particular to a laser incorporating an optical amplifier.

BACKGROUND OF THE INVENTION

The impact that an efficient, inexpensive and reliable visible laser source would have on data storage, display technology, undersea communications and optical processing has provided the stimulus for much recent work on solid state visible lasers. One approach that has yielded much success is the use of upconversion processes within rare earth doped materials to produce laser emission at a wavelength significantly shorter than the pump wavelength. For example, there has been a recent demonstration of visible lasing at 480 nm in $Tm^{3+}$—doped fluoride fibre (see Allain, J. Y., Monerie, M and Poignant, H.: 'Blue upconversion fluorozirconate fibre laser', Electron. Lett., 1990, 26 (3), pp. 166–168), and a demonstration of room temperature lasing at red, green and blue wavelengths in praseodymium doped fluorozirconate glass fibre (see Smart, R. G., Hanna, D. C., Tropper, A. C., Davey, S. T., Carter, S. F., Szebesta, D,: 'CW upconversion lasing at blue, green and red wavelengths in an infrared-pumped $Pr^{3+}$-doped fluoride fibre at room temperature', Electron. Lett., 1991, 27, (14), pp 1307–1309). Forced oscillation on two transitions simultaneously has also been demonstrated (see Percival, R. M., Szebesta, D., and Davey, S. T.: "Highly efficient and tunable operation of two colour Tm-doped fluoride fibre laser" Electron. Lett., 1992, 28, (7), pp. 671–672).

These demonstrations have dramatically changed the viability of such upconversion pumped laser schemes, and recently a significant amount of time has been spent investigating the infrared emission which emanates from the $^3F_4$ manifold in fluoride fibres doped with thulium. During the course of this work, it has become common knowledge that, when pumped at around 790 nm, the fibres glow in the blue region of the electromagnetic spectrum. One explanation for this effect, is that a first pump photon results in population being excited into the $^3F_4$ manifold (see FIG. 1 which is an energy level diagram of a thulium/terbium co-doped fluoride fibre). From this level, there are three routes for radiative decay, 0.805 μm ($^3F_4$–$^3H_6$), 1.475 μm ($^3F_4$–$^3H_4$), and 2.310 μm ($^3F_4$–$^3H_5$) with branching ratios of 0.893 0.083 and 0.024 respectively. The energy gap to the next level is sufficiently large that non-radiative decay is precluded. Thus besides the ground state ($^3H_6$) and the $^3F_4$ manifold there will be small populations in the $^3H_4$ and $^3H_5$ manifolds when under excitation. Moreover, the energy gap between the $^3H_5$ and $^1G_4$ manifolds is quite closely matched to the pump photon energy. Consequently, the sequential absorption of two pump photons could lead to a small fraction of the population excited into the $^3H_5$ manifold reaching a high enough level ($^1G_4$) to give rise to a small amount of blue emission when the excited ion subsequently decays back down to the ground state manifold $^3H_6$.

The 1992 Electronics Letter paper referred to above observed that the blue emission intensity increased significantly when stimulated emission was obtained on the 2.31 μm transition, since the population in the $^3H_5$ manifold rapidly increased under these circumstances. However, this scheme is thought to be unworkable as a blue laser, since the fibre parameters for operation at mid-infrared and blue wavelengths are widely divergent.

SUMMARY OF THE INVENTION

The applicants believe that significant gain at 475 nm can be achieved when thulium/terbium co-doped fluorozirconate fibre is pumped at 775 nm. The 475 nm emission observed originates from the $^1G_4$ level and requires the sequential absorption of 775 nm pump photons. The present invention is based on the observation by the applicants that there is blue fluorescence which is ascribed to a transition between the $^1G_4$ level and the $^3H_6$ ground state of the system FIG. 1 represents the energy levels of the thulium and terbium ions, with the relevant blue lasing transition indicated between the $^1G_4$ level and the $^3H_6$ ground state. The upper laser level may be populated by the sequential absorption of 775 nm pump photons in a process which involves excitation of ground state ions into the $^3F_4$ band, some of which then branch into the $^3H_5$ level. These ions are then further excited by pump photons into the $^1G_4$ level. A direct transition from this level to the ground state is responsible for the blue emission.

The present invention is based on an optical amplifier comprising a fluorozirconate waveguide co-doped with thulium and terbium ions, and an optical pump means coupled to the waveguide for providing an optical pump signal capable of exciting the thulium ions into the $^1G_4$ energy level, whereby the amplifier provides optical gain at about 475 nm, said optical pump means being adopted to provide an optical pump signal having a wavelength in the range of 770 nm to 790 nm, preferably about 775 nm.

The waveguide may conveniently comprise a fluorozirconate optical fibre waveguide such as a standard ZBLAN fluorozirconate fibre, but other types of waveguide may be employed. For example, it is expected that a useful configuration would be a planar waveguide structure formed by doping a fluorozirconate glass substrate. High dopant concentration would lead to compact (short waveguide length) devices.

The pump, preferably a semiconductor laser diode, may be coupled to the fibre by any known appropriate technique. For example, the high humerical aperture fluorozirconate fibre may be jointed to a silica fibre so that readily-available fused couplers, for example, can be used to couple pump and signal sources to the doped fibre.

Advantageously, the fluorozirconate waveguide is doped with thulium ions to a concentration of about 0.1%, and with terbium ions to a concentration of about 1%.

The thulium ions are excited into the $^1G_4$ level by sequential absorption of two pump photons. The first pump photon is absorbed by a thulium ion to excite that ion from the ground state ($^3H_6$) to the level $^3F_4$. The excited ions thereafter decay into the $^3H_5$ level and this decay is assisted by energy transfer to the terbium ions. After decay, the second pump photon is absorbed by the thulium ion to excite that ion to the $^1G_4$ level.

The invention also provides a laser comprising an optical amplifier and a pair of reflectors, the optical amplifier being as defined above, and the reflectors being positioned one at each end of the waveguide, the reflectors defining a resonant cavity and having reflectivities such as to provide lasing action at about 475 nm when the waveguide is pumped by the pumping means.

The reflectors, which may be mirrors or other reflectors such as Sagnac loop reflectors, define a Fabry-Perot cavity, and in known manner are selected to provide reflections sufficient to sustain lasing only at the desired wavelength.

The invention also provides for the amplification of attenuated optical signals at about 475 nm. This requires an optical amplifier as described above which is provided with an input port for accepting attenuated signals at said wavelengths and an output port for providing said signals after amplification. For amplification of attenuated signals, it is necessary to minimise, ideally to eliminate, reflections and feedback of the amplified signal because reflections tend to cause self sustaining generation of light and this constitutes an unacceptable noise.

The invention also includes a method of amplifying optical signal which method comprises providing pump radiation at wavelengths in the range 770 nm to 790 nm into a fluorozirconate waveguide co-doped with thulium and terbium ions whereby said pump radiation produces a population inversion in the terbium ions said population inversion being capable of amplifying radiation having a wavelength of about 475 nm.

BRIEF DESCRIPTION OF THE DRAWINGS

The invention will now be described in greater detail, by way of example, with reference to the accompanying drawings, in which.

DETAILED DESCRIPTION OF THE DRAWINGS

Figure 1:
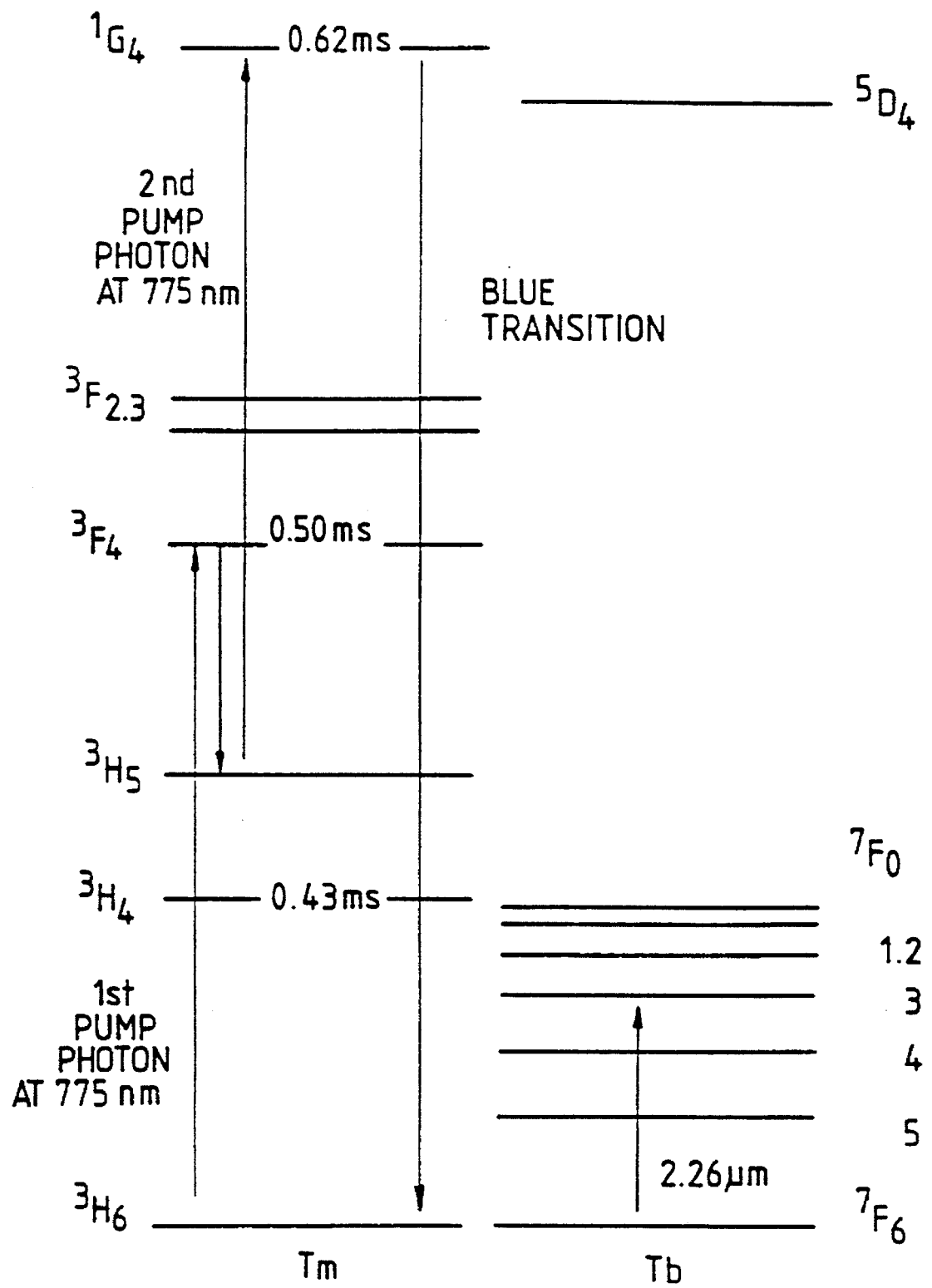
FIG. 1 is a diagram showing the energy levels of thulium and terbium ions in a ZBLAN host.
Figure 2:
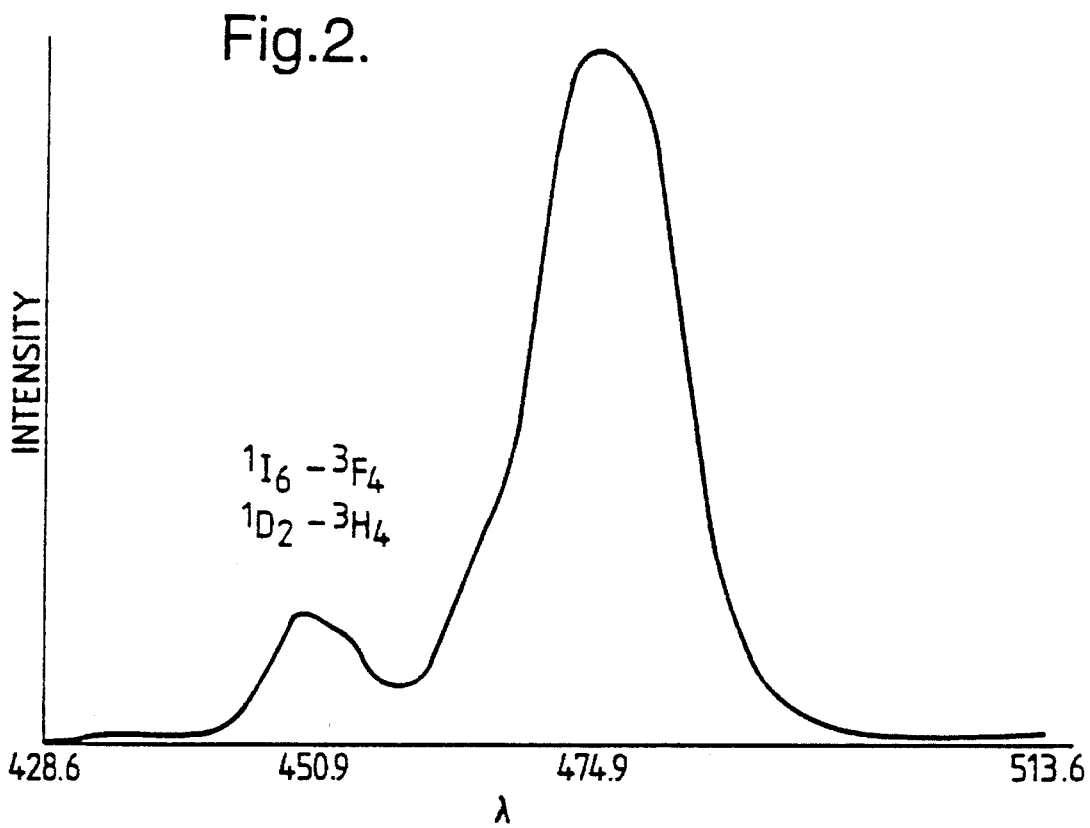
FIG. 2 is a graph of the intensity against wavelength for blue emission from the $^1G_4$ manifold.

Referring to FIG. 1, lasing at a wavelength of 475 nm is achieved by establishing a population inversion between the $^1G_4$ upper level and the $^3H_6$ ground state. Pump light at a wavelength of about 775 nm is used to excite ions into the $^3F_4$ level. As mentioned above, a proportion of these excited ions decay into the $^3H_5$ level, from where excitation to the $^1G_4$ level is possible by absorption of pump light. In order to increase the probability of this second excitation of pump energy, the applicants have found that there should be several terbium ions close to every thulium ion, so that cross-relaxation of population from the $^3H_4$ manifold in thulium over to the $^7F_0$ manifold in terbium is enhanced, thus preventing population build up in the $^3H_4$ manifold. However, a second cross-relaxation mechanism also operates, this arising as result of the of a close energy match between the 2.26 μm ground state absorption transition ($^7F_6$–$^7F_3$) in terbium and the 2.31 μm emission transition ($^3F_4$–$^3H_5$) in thulium (see FIG. 1). Due to this coincidence, the lifetime of the $^3F_4$ manifold is reduced from around 15 ms to around 0.5 ms, that is to say about two thirds of the population excited to the $^3F_4$ manifold now decays non-radiatively into the $^3H_5$ manifold. Thus there is much greater probability that a second pump photon will be excited up to the $^1G_4$ manifold, leading to much larger amounts of spontaneous blue emission. FIG. 2 shows a plot of the variation in observed blue fluorescence intensity with wavelength.

Figure 3:
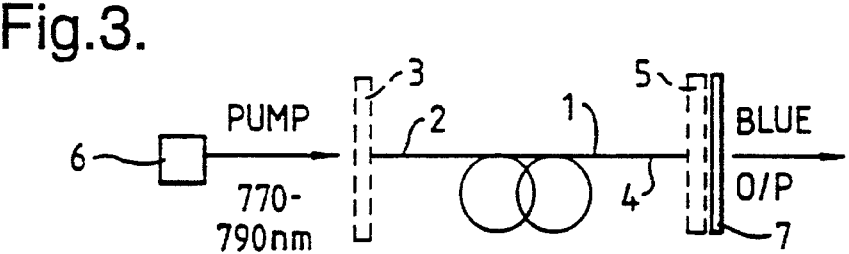
FIG. 3 is a schematic diagram of a first form of laser constructed in accordance with the invention.

Referring to FIG. 3, a first form of laser according to the present invention is based on a length of standard formulation ZBLAN fluorozirconate fibre 1 co-doped with thulium (0.1%) and terbium (1%) ions (ZBLAN denotes fluorides of Zr, Ba, La, Al and Na). The fibre 1 has a numerical aperture of 0.205, a mode cut-off of about 2.0 μm, and a core diameter of 7.5 μm. The fibre background loss at both pump and signal wavelengths is estimated to be around 1.2 dB/m. A simple Fabry-Perot laser cavity is formed by butting an input end 2 of the fibre 1 against a dielectric mirror 3, and by butting an output end 4 of the fibre against a dielectric mirror 5, the mirrors being highly reflecting (HR≧99.5%) at between 460 nm and 490 nm, and highly transmitting (HT≧80%) at between 760 nm and 800 nm. 775 nm pump light is derived from a laser 6 which is end-fire launched through the input mirror 3. A pump blocking filter 7 is used to separate the remnant pump and blue emission after transmission through the output mirror 5. The level of reflectivity of the output mirror 5 can be reduced so that greater amounts of power are available for use.

Figure 4:
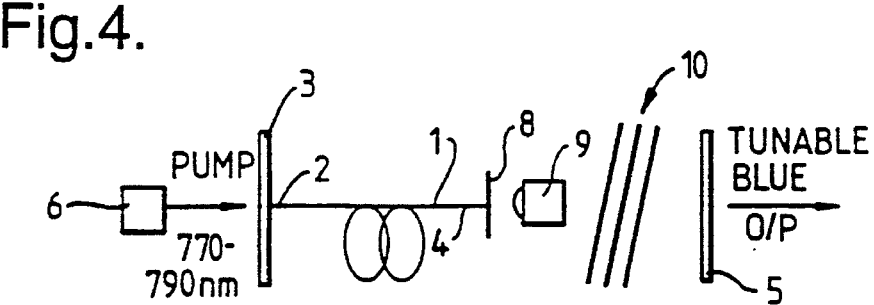
FIG. 4 is a schematic diagram of a second form of laser constructed in accordance with the invention.

FIG. 4 shows a second form of laser according to the invention. This laser is tunable, and is a modified version of the laser of FIG. 3. Accordingly, like reference numerals will be used for like parts, and only the modifications will be described in detail. Thus, the cavity of the laser of FIG. 4 is provided with a cover slide 8 to prevent reflections, a microscope objective 9 to collimate the laser output, and a three-plate birefrigent filter 10 to provide wavelength selection within the cavity.

We claim:

1. An optical amplifier comprising a fluorozirconate waveguide co-doped with thulium and terbium ions, and an optical pump means coupled to the waveguide for providing an optical pump signal capable of exciting the thulium ions into the $^1G_4$ energy level, whereby the amplifier provides optical gain at about 475 nm, said optical pump means being adapted to provide an optical pump signal having a wavelength in the range of 770 nm to 790 nm.

2. An amplifier as claimed in claim 1, wherein the optical pump signal has a wavelength of about 775 nm.

3. An amplifier as claimed in claim 1, wherein the waveguide is in the form of a fibre.

4. An amplifier as claimed in claim 1, wherein the fluorozirconate waveguide is doped with thulium ions to a concentration of about 0.1%, and with terbium ions to a concentration of about 1%.

5. An amplifier as claimed in claim 1, wherein the optical pump means is a semiconductor laser diode.

6. A laser comprising an optical amplifier and a pair of reflectors, the optical amplifier being as claimed in claim 1, and the reflectors being positioned one at each end of the waveguide, the reflectors defining a resonant cavity and having reflectivities such as to provide reflections sufficient to sustain lasing action only at about 475 nm when the waveguide fibre is pumped by the pumping means.

7. A laser as claimed in claim 6, wherein the reflectors are mirrors.

8. A method of amplifying optical signals which method comprises providing signal radiation at 475 nm and pump radiation having a wavelength within the range of 770 nm to 790 nm into a fluorozirconate waveguide co-doped with thulium and terbium ions whereby said pump radiation produces a population inversion in the thulium ions, said population inversion supporting amplification of said signal radiation.

9. A method as claimed claim 8, wherein the thulium ions are excited from the ground state ($^3H_6$) into the $^1G_4$ level by sequential absorption of two pump photons, said absorption producing a population inversion between said $^1G_4$ level and the ground date.

10. A method as claimed in claim 9, wherein the first pump photon is absorbed by a thulium ion to excite that ion from the ground state ($^3H_6$) to the level $^3F_4$, said excited ion decays to the $^3H_5$ level by energy transfer to the terbium ions, and the second pump photon is absorbed by a thulium ion that has decayed to the $^3H_5$ level to excite that ion to the $^1G_4$ level.

11. An optical amplifier comprising a fluorozirconate waveguide co-doped with thulium and terbium ions, and an optical pump means coupled to the waveguide for providing an optical pump signal capable of exciting the thulium ions into the $^1G_4$ energy level, whereby the amplifier provides optical gain at about 475 nm, said optical pump means provides an optical pump signal having a wavelength in the range of 770 nm to 790 nm, and wherein the waveguide is doped with terbium ions to a concentration which is several times the concentration of the thulium ions.

12. A method as claimed in claim 8, wherein the pump radiation has a wavelength of about 775 nm.

13. A method of generating signal radiation at about 475 nm which method comprises providing pump radiation having a wavelength within the range 770 nm to 790 nm into a fluorozirconate waveguide co-doped with thulium and terbium ions whereby said pump radiation produces a population inversion in the thulium ions such that signal radiation at about 475 nm is produced wherein said method comprises selectively returning said signal radiation into the fluorozirconate waveguide so as to sustain lasing action.

14. A method according to claim 13 wherein the pump radiation has a wavelength of about 775 nm.

15. An optical amplifier comprising an input port for accepting attenuated signals at 475 nm and an output port for providing said signals after amplification, said amplifier also comprising a fluorozirconate waveguide co-doped with thulium and terbium ions, said waveguide interconnecting said input port and said output port, wherein said amplifier also comprises a pump coupled to the waveguide for providing optical pump radiation having a wavelength in the range 770 nm to 790 nm wherein said pump radiation is adapted to excite the thulium ions to produce a population inversion which is capable of amplifying the signal received at the input port.

* * * * *